(12) United States Patent
Johnson

(10) Patent No.: US 7,725,963 B2
(45) Date of Patent: Jun. 1, 2010

(54) MATERIAL MOVER HAVING A FLUID FILM RESERVOIR

(75) Inventor: Raynor A. Johnson, Newark, DE (US)

(73) Assignee: Gray Tek, Inc., Hadensville, VA (US)

( * ) Notice: Subject to any disclaimer, the term of this patent is extended or adjusted under 35 U.S.C. 154(b) by 437 days.

(21) Appl. No.: 11/127,756

(22) Filed: May 11, 2005

(65) Prior Publication Data

US 2005/0283905 A1 Dec. 29, 2005

Related U.S. Application Data

(60) Provisional application No. 60/425,673, filed on Nov. 12, 2002.

(51) Int. Cl.
*A47C 31/00* (2006.01)
(52) U.S. Cl. .................................. 5/81.1 R; 5/81.1 HS
(58) Field of Classification Search ............... 5/81.1 R, 5/81.1 HS, 726, 652.1
See application file for complete search history.

(56) References Cited

U.S. PATENT DOCUMENTS

| | | | |
|---|---|---|---|
| 3,948,344 A | 4/1976 | Johnson et al. | |
| 4,417,639 A | 11/1983 | Wegener | |
| 4,517,690 A | 5/1985 | Wegener | |
| 4,528,704 A | 7/1985 | Wegener et al. | |
| 5,065,464 A | 11/1991 | Blanchard et al. | |
| 5,483,709 A * | 1/1996 | Foster et al. | ............... 5/81.1 R |
| 5,561,873 A | 10/1996 | Weedling | |
| 5,944,066 A | 8/1999 | Viard | |
| 5,947,168 A | 9/1999 | Viard | |
| 5,970,549 A | 10/1999 | Rudden | |
| 5,997,572 A * | 12/1999 | Arnold et al. | ............... 607/104 |
| 6,073,291 A * | 6/2000 | Davis | ........................... 5/711 |
| 6,467,106 B1 | 10/2002 | Heimbrock | |
| 6,694,557 B1 | 2/2004 | Bobey et al. | |
| 6,701,544 B2 | 3/2004 | Heimbrock | |
| 6,735,799 B1 | 5/2004 | Ellis et al. | |
| 6,735,800 B1 | 5/2004 | Salvatini et al. | |
| 6,739,001 B2 | 5/2004 | Flick et al. | |
| 6,760,939 B2 | 7/2004 | Ellis et al. | |
| 6,782,574 B2 | 8/2004 | Totton et al. | |
| 6,800,165 B2 | 10/2004 | Wang | |

(Continued)

FOREIGN PATENT DOCUMENTS

| | | |
|---|---|---|
| WO | WO 03/094818 | 11/2003 |
| WO | WO 2005/058222 | 6/2005 |

*Primary Examiner*—Fredrick Conley
(74) *Attorney, Agent, or Firm*—Burr & Brown

(57) ABSTRACT

A material mover includes substantially rectangular top and bottom sheets connected to perimeter sidewalls defining at least one chamber. The bottom sheet is perforated with orifices at least in a central portion and has a greater width than that of the top sheet at least in middle and lower regions of the top and bottom sheets. A plurality of partition members connect at least portions of the top and bottom sheets to one another within the chamber, extend parallel to lateral edges of the top and bottom sheets, and are spaced from the perimeter sidewalls. A fluid weir is defined along an outer periphery of the bottom sheet to provide a fluid film reservoir at least under the central portion of the bottom sheet including the orifices. Fluid in the fluid reservoir is substantially contained by the fluid weir.

22 Claims, 8 Drawing Sheets

U.S. PATENT DOCUMENTS

| | | |
|---|---|---|
| 6,813,790 B2 | 11/2004 | Flick et al. |
| 6,820,292 B2 | 11/2004 | Heimbrock |
| 6,848,135 B1 | 2/2005 | Kohlman |
| 6,857,143 B2 | 2/2005 | McNulty |
| 6,859,967 B2 | 3/2005 | Harrison et al. |
| 6,898,809 B2 | 5/2005 | Davis |
| 2002/0162172 A1 | 11/2002 | Federowicz |
| 2002/0166168 A1 | 11/2002 | Weedling et al. |
| 2003/0070226 A1 | 4/2003 | Heimbrock |
| 2003/0159212 A1 | 8/2003 | Patrick et al. |
| 2004/0128772 A1 | 7/2004 | Branson et al. |
| 2004/0168256 A1 | 9/2004 | Chaffee |
| 2004/0226101 A1 | 11/2004 | Lin et al. |
| 2005/0028273 A1 | 2/2005 | Weedling et al. |
| 2005/0034229 A1 | 2/2005 | Weedling et al. |
| 2005/0034230 A1 | 2/2005 | Weedling et al. |
| 2005/0034242 A1 | 2/2005 | Davis |
| 2005/0036873 A1 | 2/2005 | Ikehata et al. |
| 2005/0044631 A1 | 3/2005 | Wang |
| 2005/0055768 A1 | 3/2005 | Assink |
| 2005/0060806 A1 | 3/2005 | Wilkinson |
| 2005/0060809 A1 | 3/2005 | Rogers |
| 2005/0076437 A1 | 4/2005 | Johnson |
| 2005/0091751 A1 | 5/2005 | Davis |
| 2005/0091752 A1 | 5/2005 | Gowda |
| 2005/0091753 A1 | 5/2005 | Salvatini et al. |
| 2005/0100431 A1 | 5/2005 | Mayerberg II et al. |
| 2005/0102749 A1 | 5/2005 | Heimbrock |
| 2005/0132490 A1 | 6/2005 | Davis |

\* cited by examiner

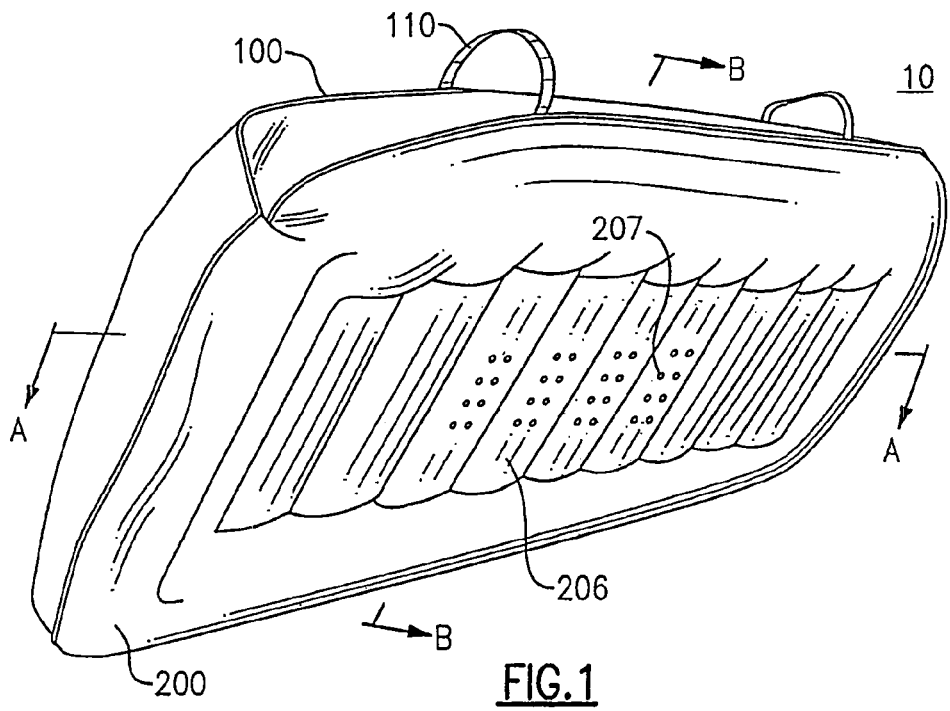
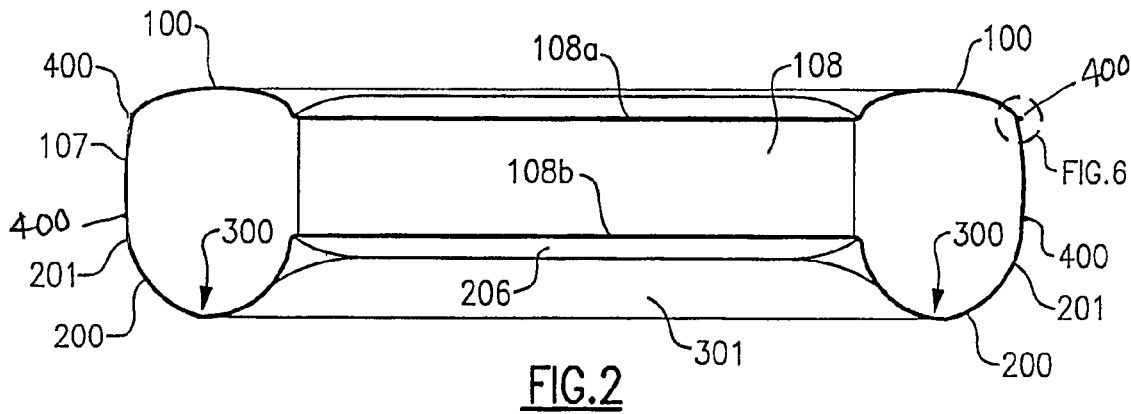
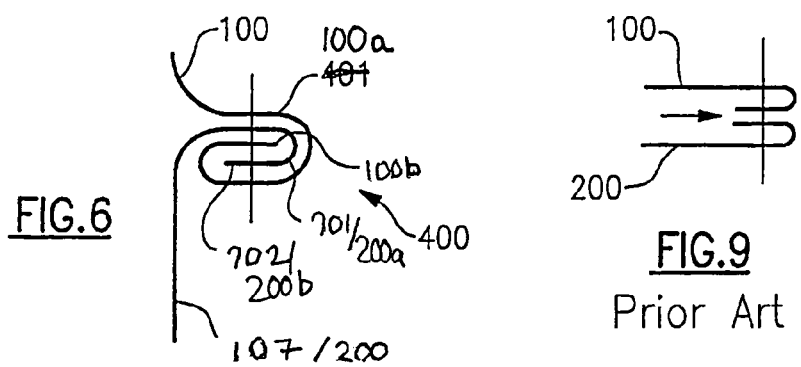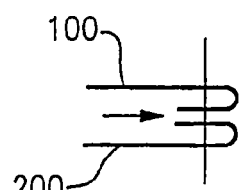

MATERIAL MOVER HAVING A FLUID FILM RESERVOIR

CROSS REFERENCE TO RELATED APPLICATIONS

This application is a continuation-in-part of International Application No. PCT/US03/35709, filed Nov. 10, 2003, and claims the benefit under 35 USC §119(e) of U.S. Provisional Application Ser. No. 60/425,673, and is related to U.S. patent application Ser. No. 10/926,839, filed Aug. 26, 2004, the entireties of which are incorporated herein by reference.

FIELD OF THE INVENTION

This invention relates generally to a fluid-elevated material mover, and more particularly to a fluid-elevated material mover providing enhanced control of a fluid film created and at least partially maintained underneath at least a central portion thereof for facilitating safe, practical and efficient transfer of a wide variety of loads over transporting surfaces.

BACKGROUND OF THE INVENTION

The need to safely and easily translocate objects without damaging the object or the transfer surfaces, while conserving electric power and manpower resources, spans the gamut of practical applications. Medical, industrial, and shipping environments are but a few examples in which it is often extremely difficult to easily and practically move an object over a surface, even with the aid of some sort of transfer device assisting in the transport.

The range of applications desiring an improved transport device is vast. Examples of objects which require occasional, careful and economically feasible transport include artistic sculptures or other museum exhibits, and animals in need of medical attention at farms, zoos, conservation sites or veterinary hospitals. Moving objects in the shipping industry is yet another application desiring a transfer mechanism using less manpower resources and decreased electric power consumption requirements. Such an economically efficient transfer mechanism would provide great benefits to those in industry who are charged with the often complex and burdensome tasks associated with transferring loads from one locale to another such as, for example, shipping vessels (e.g., air, truck, rail, and cargo ship freight) to storage facilities (e.g., warehouses, docks, and the like).

It is often necessary to move persons, such as accident victims, the elderly, comatose, paralyzed or otherwise immobilized patients, from one support surface, such as a bed, to another support surface, such as a gurney or wheeled hospital cart. There are many difficulties confronting those responsible for moving such immobilized or fragile persons in a safe, comfortable manner, while, at the same time, attempting to conserve manpower and electrical energy resources. For example, patients who cannot sit up or move by themselves can be particularly difficult to move from a stretcher to a bed or vice versa, and the only way to safely reposition such fragile patients is to use two or three nurses, orderlies or other attendants.

Prior art patient transfer devices frequently take the form of "floating" or air-elevated air mattress-type movers. Examples of such air mattress-type movers are disclosed in U.S. Pat. No. 6,073,291 to David T. Davis and U.S. Pat. No. 5,561,873 to Robert E. Weedling, the entireties of which are incorporated herein by reference. These prior art mattress-type transfer devices include small perforations in the bottom and are inflated with air to obtain and at least temporarily maintain the mattress in an inflated state. During such inflation, a continuous supply of pressurized air is expelled from the bottom of the transfer device through the perforations to form an air film which supports the inflated transfer device on any reasonably flat, semi-continuous surface, in the same manner as an air pallet used for industrial applications within shops, plants and warehouses.

The prior art inflatable transfer devices operate by continuously supplying air under pressure into a plenum chamber, which is defined by the transfer structure itself, in a sufficient amount to maintain inflation of the plenum chamber. These prior art inflatable transfer devices have a serious drawback, however, in that only a relatively weak air film is provided due to the free and unchecked dissipation of air from the fluid film beneath the transfer device. The poor quality air film can be attributed to the fact that the prior art devices fail to provide a structure that controls the distribution of air that continuously exits the perforations in the bottom of the transfer apparatus. One particularly disfavorable effect of not controlling the dissipation of air is that greater pulling efforts are required to move the transfer device over a transporting surface. This problem is exacerbated by sudden degassing when the transfer device encounters even small gaps or breaks in an irregular transporting surface. This problem also presents a serious risk of injury for those who pull such a transport device, especially if insufficient manpower is available to meet the increased pulling demands resulting from the weak air film underneath the transfer device. In addition to the above, the transfer device itself is susceptible to abrasion damage from the increased frictional forces exerted on the bottom of the transfer device as a result of the weak air film. In that manner, the lack of a suitable air film underneath the device not only creates substantial risks of injury to personnel but also tends to shorten the life and inhibit the function of the transfer device itself.

Another serious drawback related to the unchecked dissipation of air from underneath prior art transfer devices is that more electric power is needed to continuously resupply the dissipating air film. Accordingly, the air blowers used to inflate prior art transfer structures tend to consume relatively large amounts of electric power during use. In the context of transporting a medical patient, the patient is thus continuously exposed to the typically loud and often unsettling sounds associated with using such high power blower units during transport.

As mentioned above, the poor quality of the air films associated with the prior art transfer devices is attributed, at least in part, to the fact that the prior art devices do not inhibit or even control the random dissipation of air from the air film underneath the bottom portion thereof. For example, even though FIG. 2 of the '291 patent appears to show that the central portion of the bottom sheet is raised or elevated with respect to the outer peripheral portions, this drawing is merely an artist's rendition of the prior art air mattress in a free-standing state (i.e., not in use to create a fluid film for transport). This rendition is misleading, however, because it is clear that the central portion of the '291 bottom sheet is not raised or elevated with respect to the outer peripheral portions when the transfer apparatus is actually used on a transfer surface. This is clear from the other views of the air mattress shown in FIGS. 5-7 of the '291 patent and the explicit disclosure of the '291 patent itself, which recites that when the transfer apparatus is resting on a more or less level surface as in actual use, the bottom also assumes a more or less planar configuration and the raised sides and portions of the top surface become even more pronounced. Without providing any structures that actually function to contain or control the rate of air dispersion from the air film underneath the essentially flat bottom surface of the air mattress, a prior art air mattress such as that of the '291 patent suffers from the same drawbacks relating to poor quality air films discussed above. In addition, the operating costs associated with the prior art transfer apparatus shown in the '291 patent are undesirably high due to the high demand for electric power required to operate an air blower to maintain sufficient plenum chamber inflation and required to counter-balance the high, steady and otherwise uncontrolled rate of air dissipation from the fluid film beneath the transfer apparatus.

Prior art inflatable transfer apparatuses are further plagued by plenum chamber air loss due to the ill effects of certain types of stresses that are placed on stitched seam lines connecting various sheets making up the transfer devices. These types of stresses originate from the internal pressure required to maintain the inflated state of the plenum chamber and the vertical and/or lateral external mechanical stresses that are placed upon the transfer devices during load transfer. FIG. 9 of the present application illustrates such a prior art seam line structure, including portions of top sheet 100 and bottom sheet 200 that are folded under to form a double layer of top and bottom sheets 100 and 200, respectively, and the double layers are placed parallel to one another and stitched to form the seam line junction. Due to the stretching motion imposed on the sheets during high pressure inflation and due to the vertical and/or lateral stresses imposed on the seam lines during operation, separations or gaps tend to develop between top sheet 100 and bottom sheet 200 during use of the transfer apparatus. Air loss from the plenum chamber through such seam line separations or gaps further reduces the efficiency of the transfer apparatus by causing the need to supply an even higher level of electric power to the blower unit in order to maintain an inflated plenum chamber and the desired fluid film therebeneath. Prior art transfer devices that are susceptible to such air loss through such seam lines, coupled with a lack of fluid film retention means beneath the air mattress, are dangerous to use, suffer from a reduced useful life, and require a high power blower that is typically more costly, bulky and which disadvantageously consumes a large amount of electricity.

Yet another problem associated with prior art air mattress-type movers is that the air inlet for receiving a hose or connection conduit from the blower unit is typically positioned in only a single location on the air mattress, most often at the head-end. Although some prior art transfer devices offer air inlets on both sides at the head-end in an effort to improve access, it is still often inconvenient to connect a blower hose to the air mattress at this location, particularly when a patient's head is positioned in close proximity thereto. Further, since the blower hose or connection conduit typically extends perpendicularly from the air mattress, a substantial amount of clearance must be provided at that portion of the air mattress to facilitate this connection. In a health care setting, this means that the specific location of the air inlet not only dictates where a patient can be comfortably positioned thereon, but also dictates where the air mattress can be located for use within a given room, hallway or the like.

A further problem associated with prior art transfer devices is that the blower hose is usually inserted into an air inlet in the mattresses without providing any particular means for retaining the hose in the air mattress during operation. As such, in the event of a sudden load shift, or if a patient is obese, for example, the possibility that the blower hose will be forced back out of the air inlet due to the increased air pressure within the air mattress plenum chamber presents a dangerous situation. If the blower is operating at a high power, such as that typically required of air blowers for the prior art transfer devices for the reasons mentioned above, the suddenly disconnected blower hose could flail about and potentially cause a significant threat of injury to the patient or the medical personnel operating the air mattress. This would also cause sudden degassing of the plenum chamber by cutting off the pressurized fluid supply. Conversely, a sudden degassing of the plenum chamber could also dislodge the air hose and further harm a patient on the transfer device, or another type of load positioned on the transfer apparatus, or nearby personnel.

In view of the foregoing, it would be desirable to provide a material mover employing a structure for defining, maintaining, and controlling the fluid dissipation of a fluid film reservoir beneath a bottom portion of an inflatable transfer device, as well as to provide an improved fluid-retaining seam line junction between the sheet material defining the transfer device itself. It would also be desirable to provide air inlets in a plurality of positions to beneficially allow the blower hose to be connected to the air mattress at multiple locations along the air mattress, which increases the number of possible locations within a room, a hallway, or the like, where the air mattress could be used, and thus, increases the practical applicability of such transfer devices in crowded storage container or warehouse situations as well as in the health care setting. Further, it would be desirable to provide a reliable and secure connection between the transfer device and the blower hose of the inflation device (fluid provider or blower) that improves both the safety and convenience associated with the use of the transfer device.

SUMMARY OF THE INVENTION

It is an object of the present invention to overcome the above-discussed drawbacks of prior art transfer apparatuses.

In accordance with one embodiment of the present invention, a material mover is provided, including a plenum chamber or a fluid filled cavity defined by substantially rectangular top and bottom sheets and by perimeter sidewalls that surround at least a portion of the chamber and connect at least a portion of the top and bottom sheets to one another. The plenum chamber is further divided into a plurality of smaller, open-ended chambers by one or more partition members positioned between the top and bottom sheets within the plenum chamber and extending laterally with respect to the dimensions of the top and bottom sheets. The bottom sheet of the material mover includes a plurality of orifices through which fluid provided to the plenum chamber is expelled to create a fluid film beneath at least a central part of the bottom sheet of the material mover. A fluid weir, defining a fluid reservoir beneath at least the central portion of the bottom sheet, is provided along the bottom periphery of the material mover to substantially contain the fluid within the reservoir and substantially inhibit the escape of fluid from the reservoir beneath the material mover.

Easy, safe and efficient transfer of loads positioned on the top sheet of the material mover is provided at least in part by inhibiting (e.g., controlling) the dispersion of the fluid film from the reservoir beneath the material mover. That is, the fluid weir, which can be any structure capable of containing the fluid film to regulate or control fluid dissipation therefrom, effectively defines the boundaries of a fluid reservoir under the material mover. As such, the fluid weir effectively maintains the desired volume of the fluid film within the fluid reservoir and prevents the fluid from randomly escaping from the fluid reservoir. By maintaining and controlling a sufficient fluid film beneath a portion of the material mover, the quality of the fluid film in the reservoir and between the material mover and the transporting surface is improved, and thus, less manual effort and electric power are required to move loads across transporting surfaces. Further, the friction forces exerted on the material mover during load transfer are significantly reduced, which increases the useful life of the material mover.

Employing the fluid weir structure according to the present invention, which contains the fluid film and inhibits the free and random dispersion of fluid from the fluid film underneath the central portion of the material mover, also enables the material mover to be efficiently operated using substantially less air blower power. Furthermore, a significant decrease in pulling efforts, both manually and/or automated, needed to translocate a load or object placed on the material mover is achieved by regulating the rate of fluid film dispersion from underneath the material mover using a fluid weir structure according to the present invention. Accordingly, the material mover of the present invention is easily adapted to move significantly heavier loads while requiring the same or less electric power and less pulling effort than convention material movers that lack such a fluid weir structure.

Preferably, the partition members extend in a generally parallel direction with respect to the lateral edges of the top and bottom sheets and are preferably spaced from each perimeter sidewall of the material mover.

The substantially rectangular top and bottom sheets of the material mover according to the present invention each include longitudinal and lateral edges, an upper region, a middle region and a lower region. According to one embodiment, the width of the bottom sheet is greater than the width of the top sheet, at least in the middle and lower regions of the top and bottom sheets. At least a central portion of the bottom sheet is perforated with a plurality of orifices through which fluid present in the plenum chamber exits to a given area beneath the material mover, that is, to a fluid reservoir defined by the fluid weir.

Preferably, the perimeter sidewalls connect at least a portion of the longitudinal edges of the top sheet and the bottom sheets to one another. In addition to the top and bottom sheet longitudinal edges, the perimeter sidewalls can also connect the lateral edges of the top and bottom sheets to one another. According to one aspect of the present invention, the perimeter sidewalls preferably at least extend substantially along the entire length of the longitudinal edges in the middle region of the top and bottom sheets. According to another aspect of the present invention, where the perimeter sidewalls also connect the respective lateral edges of the top and bottom sheets, it is preferred that the perimeter sidewalls at least extend along substantially the entire length of the lateral edges of the top and bottom sheets. Thus, the material mover of the present invention can include lateral and longitudinal perimeter sidewalls that connect the top and bottom sheets to one another around parts or around the entire outer periphery of the material mover. The perimeter sidewalls comprise one or more bands of material extending around all of the peripheral edges of the top and bottom sheets so as to connects the top and bottom sheets to one another to thereby define an inflatable or plenum chamber of the material mover.

Preferably, at least a portion of the perimeter sidewalls are reinforced with another layer of reinforcing material that can be made of the same material or a different material as the material forming the perimeter sidewalls. The width of the reinforcing material is preferably less than the width of the corresponding perimeter sidewalls. More preferably, the reinforcing material extends substantially along the entire length of the perimeter sidewalls.

The height of the longitudinal perimeter sidewalls should be less than the height of the partition members along at least a portion of the longitudinal edges of the top and bottom sheets. Similarly, when lateral perimeter sidewalls are provided, the height of the lateral perimeter sidewalls is preferably less than the height of the partition members along at least a portion of the lateral edges of the top and bottom sheets. This dimensional relationship between the perimeter sidewalls and the partition members, which is partially attributable to the width difference between the top and bottom sheets (i.e., the bottom sheet has a greater width dimension than the top sheet), is important in defining at least a portion of the fluid weir and fluid reservoir (discussed immediately below) beneath at least a central portion of the material mover.

As mentioned above, the material mover according to the present invention includes a fluid weir structure defined along the outer periphery of the bottom sheet that effectively provides a fluid reservoir under at least the central portion of the bottom sheet in the vicinity of the orifices or perforations therein. Pressurized fluid present in the plenum chamber is continuously supplied to the fluid reservoir via the perforations in the bottom sheet, such that a sufficient volume of fluid is available to both maintain the inflating level of the plenum chamber and to maintain the fluid film over which the material mover glides above the transfer surfaces. The fluid weir effectively contains the fluid in the reservoir, and thus controls and substantially inhibits undesired dispersion of fluid from the fluid reservoir. Accordingly, the fluid film is retained within the fluid film reservoir for a longer duration, thus reducing the need for a high power to provide a constantly high fluid flow into the plenum chamber and thereby enhancing the performance and efficiency of the material mover of the present invention.

According to another aspect of the present invention, a seam line junction or joining portion is formed between the top sheet and at least one of the bottom sheet and the perimeter sidewalls. When the seam line junction is provided between the top and bottom sheets, an end portion of the top sheet is preferably folded over an end portion of the bottom sheet and looped around a terminal end of the bottom sheet, such that a terminal end of the top sheet is interposed between a region of the end portion of the bottom sheet and the terminal end of the bottom sheet.

When the seam line junction is provided between the top and bottom sheets and the perimeter sidewalls, end portions either or both of the top and bottom sheets are folded over a respective end portion of the perimeter sidewalls and looped around a respective terminal end of the perimeter sidewalls. The terminal ends of the top and bottom sheets are interposed between a portion of the perimeter sidewalls proximate the end thereof and the terminal end of the perimeter sidewalls.

The structures described above provide substantial reinforcement to the seam line junction between the sheets of the material mover according to the present invention compared to those seam junctions in prior art structures. Accordingly, the seam line junction or joining portions of the present invention do not easily separate due to stretching motions imposed on the sheets during inflation of the plenum chamber. The seam line junction effectively aids the fluid retention-ability of the plenum chamber itself, and advantageously allows for the use of a lower power blower to both maintain sufficient inflation of the plenum chamber and a sufficient fluid film within the reservoir, by substantially preventing air loss at the seam lines. Moreover, the reinforced seam line junction of the present invention is capable of withstanding significantly vertical and/or lateral stresses that are applied to the material mover during rapid inflation, load positioning or translocation of loads across transporting surfaces, and air loss at the seam lines due to such stresses is substantially prevented. Accordingly, the material mover according to the present invention is provided with enhanced durability.

According to yet another aspect of the present invention, one or more fastening means are provided on any surface of the material mover. Examples of suitable fastening means include, but are not limited to, a hook-and-loop fastener (e.g., Velcro®), a mating surface for a snap-button, magnetic thread fasteners, magnetic tape fasteners, adhesive material fasteners or the like.

The fastening means preferably includes a first mating surface having a fluid inlet orifice located in a portion thereof and a second mating surface corresponding to the first mating surface to provide a flap covering the first mating surface. In addition to corresponding to the second mating surface, the first mating surface also preferably corresponds to a mating surface of a portion of a fluid provider unit, such as a coupler, in order to provide a secure connection between the fluid inlet orifice and the fluid provider unit. The fastener structure is preferably strong enough to retain at least a portion of a fluid provider unit during inflation of the plenum chamber and to prevent fluid leakage from the inflated plenum chamber.

The locations of the fluid inlet arrangements are not particularly limited to any one surface of the material mover. The fastener structures can be provided in positions on one or more surfaces, or on every surface of the material mover so long as the above-discussed requirements for the fluid inlet arrangements are satisfied. For example, at least one fastener can be provided at one or more locations on a surface portion of at least two, at least three, or all of the surfaces selected from the group consisting of the top sheet, the bottom sheet, at least one of the lateral perimeter sidewalls, and at least one of the longitudinal perimeter sidewalls. Preferably, at least one fastener is provided in at least one location on each of the top sheet, the bottom sheet, the lateral perimeter sidewalls and the longitudinal perimeter sidewalls.

Providing numerous fluid provider unit connection points at multiple locations on the material mover prevents the position of the material mover's fluid inlets from dictating, and thus limiting, the places where the material mover can or cannot be suitably used within an enclosure, such as a room, hallway or even with a shipping or storage container. In other words, the material mover according to the present invention preferably includes a plurality of such fluid inlets such that at least one inlet is accessible regardless of whether the load to be transferred is initially located proximate a wall or other objects blocking other inlets. Eliminating any strict spacing requirements between the material mover and another object or the wall broadens the available locations within a room, a hallway, or the like, where the material mover can effectively be used to transfer a load.

When at least one fastener is positioned on a side surface portion of the material mover, the material mover can easily function as means for jacking a load positioned thereon to a desired height. For example, the material mover having a patient or load placed thereon can be positioned adjacent a higher bed mattress or storage surface and then inflated to elevate the patient to an appropriate height to ensue the safe transfer of the patient or load from the material mover onto the previously higher bed mattress or storage surface.

The manner in which fluid is supplied from a fluid provider unit, such as an air blower, into the inflatable or plenum chamber through the fluid inlet arrangements is not particularly limited so long as excessive vibratory forces on the top and bottom sheets as fluid is provided into the plenum chamber are reduced and preferably prevented. For example, fluid can be supplied into the plenum chamber via an internal conduit such as a bladder tube in fluid communication with the fluid inlet orifice and the plenum chamber, where one end of the conduit is attached to the inlet orifice of the fastener and the other end extends inwardly toward an internal central portion of the plenum chamber. In this case, the conduit or bladder tube functions to prevent the top and bottom sheets from excessively vibrating. The conduit or bladder tube itself preferably includes at least one orifice opening into the plenum chamber through which the fluid flows from the fluid provider system into the plenum chamber. In the material mover according to the present invention, however, it is preferred that fluid is supplied directly into the plenum chamber from the fluid provider unit without the need to use such a bladder tube structure. In this case the rigidity of the fastener structure and the perimeter sidewalls functions to restrict the vibratory forces exerted on the top and bottom sheets when fluid enters the plenum chamber.

According to another aspect of the present invention, the fastener includes a retractable fluid inlet conduit having one end attached to an inner surface of the lateral perimeter sidewall near the fluid inlet orifice and a second end capable of being pulled through the fluid inlet orifice such that the second end of the conduit extends away from the fastener and is located outside the material mover. The retractable conduit includes additional fastening means for receiving and securing at least a portion of the fluid provider unit, such as a coupler, therein. While the fastening means of the retractable conduit is not particularly limited, suitable examples include a snap-button fastener provided on an inner circumferential surface and/or an adjustable tightening strap with a hook-and-loop fastening means positioned around the outer circumferential surface of the second end of the retractable fluid inlet conduit.

The retractable fluid inlet conduit provides a retention mechanism for at least a connecting portion of the fluid provider unit coupled thereto and effectively prevents the connected portion of the fluid provider unit from unexpectedly detaching from the fluid inlet of the material mover. This reduces the risk of a blower hose suddenly detaching and flailing about which could cause a significant threat of injury or damage to a patient or a load positioned on the material mover, or to the personnel operating the material mover. This retention mechanism also helps to prevent a sudden degassing of the plenum chamber by reducing the chances that the blower hose will unexpectedly detach during use.

According to another embodiment of the present invention, a fluid mattress is provided, wherein the width of the top sheet is greater than the width of the bottom sheet, at least in the middle and lower regions of the top and bottom sheets. Further, a portion of the top sheet is preferably perforated with a plurality of orifices through which fluid exits from a plenum chamber to provide therapy to the patient. The orifices are located at least in a central portion of the top sheet. A patient restraint mechanism, which essentially mirrors the fluid weir structure described above, is defined on the outer peripheral portions of the top sheet at least in part by virtue of the extra width of the top sheet along the outer periphery thereof, which effectively physically contains a patient or load positioned on the central part of the fluid mattress. It will be readily understood that this embodiment is essentially an upside-down arrangement of the material mover according to the first embodiment, and various other aspects of the first embodiment described above can be included in the second embodiment.

Further, the orifices in the top sheet of the fluid mattress according to this embodiment supply a therapeutic treatment fluid to the patient and/or suppress decubitis ulcer formation by providing a fluid film between the top sheet of the mattress and the patient positioned thereon to reduce pressure between the patient and the fluid mattress. Accordingly, the fluid film lessens the severity of injuries at pressure areas on the patient's body, which often occur on bony prominences and can cause, for example, sacral decubitus.

According to another embodiment of the present invention, an inflatable support device is provided, including a substantially rectangular top sheet having opposed longitudinal edges defining a length dimension, opposed lateral edges defining a width dimension, an upper region, a middle region and a lower region and a substantially rectangular bottom sheet having opposed longitudinal edges defining a length dimension substantially corresponding to the length dimension of the top sheet, opposed lateral edges defining a width dimension, an upper region, a middle region, a lower region. The bottom sheet is connected to the top sheet about the outer periphery thereof to define opposed longitudinal and opposed lateral sides of the material mover and to define a plenum chamber between the top and the bottom sheets. The inflatable support device also includes a plurality of orifices perforating at least a central portion of at least one of the top and the bottom sheets. The orifices are in fluid communication with the plenum chamber and with the atmosphere on the at least one of the top and aid bottom sheets. The inflatable support device also includes means for connecting the top and the bottom sheets together in a height direction of the material mover within at least a portion of the plenum chamber, and at least one fluid weir defined at least along an outer peripheral portion of the at least one of the top and the bottom sheets and surrounding a fluid reservoir including the orifices on the at least one of the top and the bottom sheets. A fluid supplied to the plenum chamber is provided to the fluid reservoir from the plenum chamber via the orifices and a fluid film is formed in the reservoir at least in the central portion of the one of the top and the bottom sheets. The fluid in the fluid film is (1) substantially contained in the fluid reservoir by the fluid weir and (2) substantially inhibited from dissipating from the fluid reservoir by the fluid weir.

According to one aspect of this embodiment of the present invention, the means for connecting the top and the bottom sheets together comprises at least one partition member extending in a generally parallel direction with respect to the lateral edges of the top and the bottom sheets and is laterally spaced a distance from the longitudinal and the lateral sides of the material mover.

According to another aspect of this embodiment of the present invention, the means for connecting the top and the bottom sheets together comprises a direct junction between a portion of the top sheet and a portion of the bottom sheet. The direct junction is preferably laterally spaced a distance from the longitudinal and the lateral sides of the material mover.

According to yet another aspect, the material mover comprises one or more peripheral sidewalls disposed between and connecting at least a part of at least one of (1) the lateral edges of the top sheet and the lateral edges of the bottom sheet to define the lateral sides of said material mover and (2) the longitudinal edges of the top sheet and the longitudinal edges of the bottom sheet to define the longitudinal sides of the material mover. When the material mover includes one or more partition members as described above, the height dimension of the partition members is preferably greater than the height dimension of the peripheral sidewalls.

BRIEF DESCRIPTION OF THE DRAWINGS

For a better understanding of the nature and objects of the invention, reference should be made to the following detailed description of a preferred mode of practicing the invention, read in connection with the accompanying drawings, in which:

FIG. 1 is a perspective bottom view of an inflated material mover according to one aspect of the present invention;

FIG. 2 is a cross-sectional view taken along line B-B of the material mover of FIG. 1;

FIG. 6 is a cross-sectional view of a fold-over type seam line junction joining the top, bottom and perimeter sidewall sheets of the material mover according to one aspect of the present invention;

FIG. 9 is a cross-sectional view of a conventional seam line junction between two sheets of an inflatable transport apparatus;

DETAILED DESCRIPTION OF THE INVENTION

Figure 3:
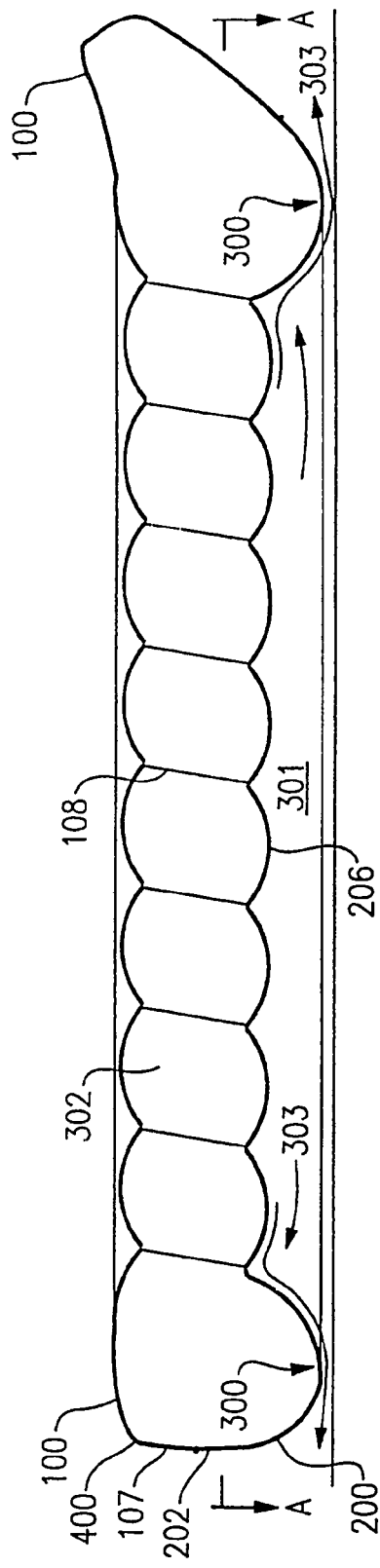
FIG. 3 is a cross-sectional view taken along line A-A of the material mover of FIG. 1.
Figure 8:
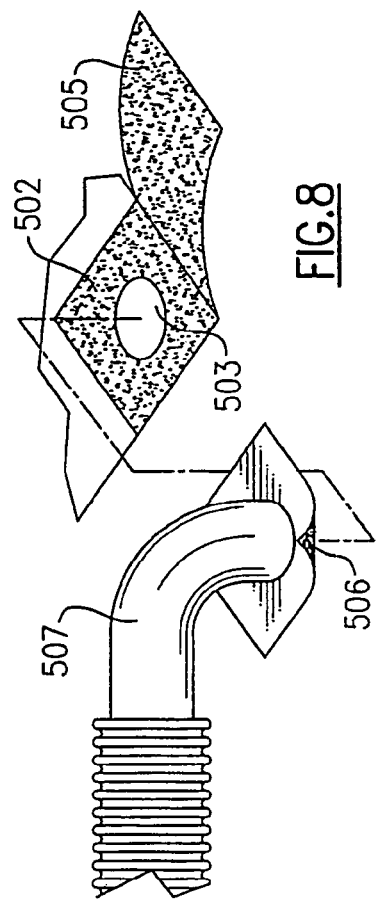
FIG. 8 is a perspective view illustrating the coupling relationship between a fluid provider unit and the fluid inlet arrangement shown in FIG. 7.

Referring to FIGS. 1-3, material mover 10 includes a plenum chamber 302 (seen more clearly in FIG. 3) adapted to receive and at least temporarily contain a fluid. The chamber 302 is defined by rectangular top and bottom sheets 100 and 200, respectively, that are connected to one another and connected together via perimeter sidewalls 107. Any fluid, such as air, oil, or water, for example, in the plenum chamber (introduced via a fluid inlet, not shown) exits through a plurality of orifices 207 formed in a portion of bottom sheet 200 to create a fluid film 303 in a fluid reservoir 301 beneath at least a central portion of material mover 10 and between the bottom sheet 200 and the surface on which the material mover is provided.

Figure 4:
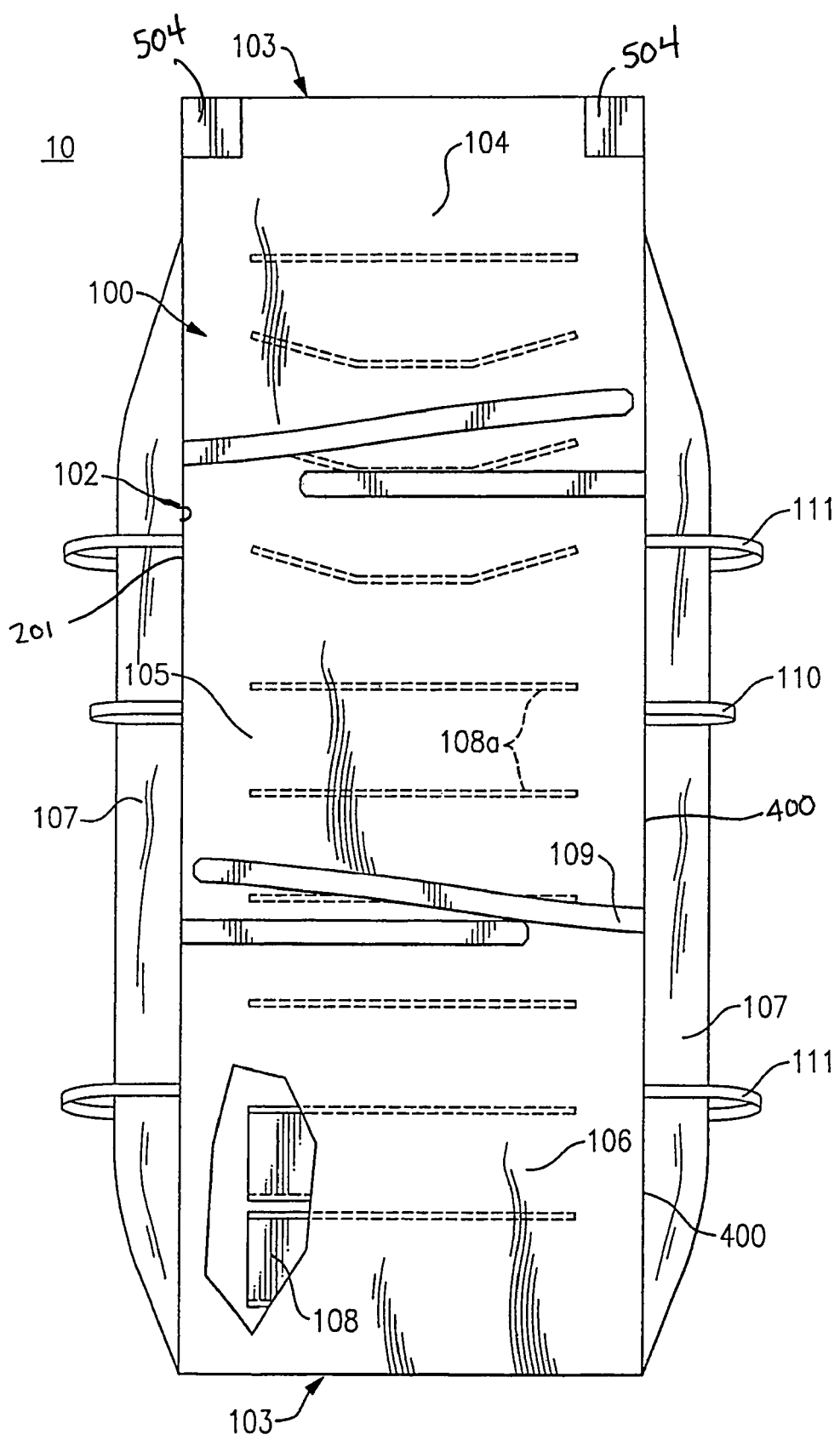
FIG. 4 is a top view of an uninflated material mover according to another aspect of the present invention.
Figure 5:
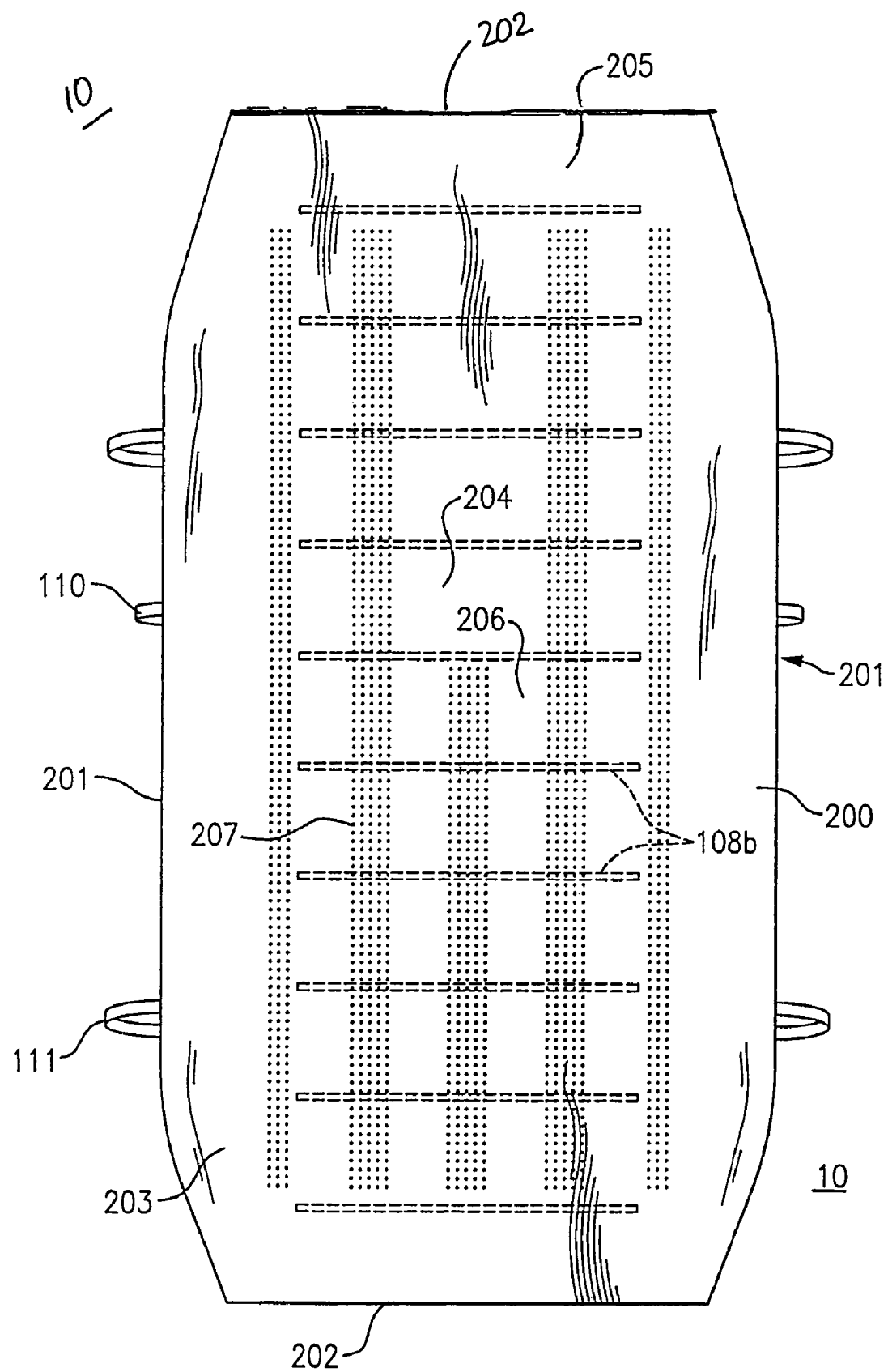
FIG. 5 is a bottom view of the material mover of FIG. 1.

As shown in FIG. 4, portions of the respective longitudinal edges 102 and 201 of the top and bottom sheets 100, 200 are connected to portions of the perimeter sidewalls 107 via a seam line junction 400 (discussed in further detail below). The perimeter sidewalls 107 are interposed between portions of ends of the respective longitudinal edges 102, 201 of the top and bottom sheets 100, 200 and extend substantially along the entire longitudinal length of the lower region 106 and middle region 105 of the top sheet. Similarly, the perimeter sidewalls 107 extend substantially along the entire longitudinal length of the lower region 203 and the middle region 204 of the bottom sheet.

Portions of the respective lateral edges 103 and 202 of the top and bottom sheets 100, 200 are directly connected to one another across the upper regions 104, 205 and lower regions 106, 203 of the top and bottom sheets 100, 200. The plenum chamber 302 is therefore defined by and enclosed by the interconnected top sheet 100, bottom sheet 200 and in longitudinal portions, by the perimeter sidewalls 107 connecting the top and bottom sheets 100, 200. Although it is not shown, it should be noted that portions of the respective longitudinal edges 102, 201 of the top and bottom sheets 100, 200 could also be directly connected to one another proximate the upper regions 104, 205 and lower regions 106, 203 of the top and bottom sheets 200. Moreover, portions of the respective longitudinal edges 102, 201 of the top and bottom sheets 100, 200 could also be directly connected to one another along substantially the entire longitudinal length of the longitudinal side edges 102, 201 of the material mover so long as the width of the bottom sheet 200 is sufficiently greater than that of the top sheet 100 to provide a sufficient amount of excess material, at least at the lower longitudinal side portions of the material mover, to be capable of expanding to have a height that is sufficient to define the fluid weir 300.

FIGS. 2 and 3 show the internal structure of a plenum chamber in a material mover according to the present invention. A plurality of partition members 108 extending vertically (defining a height dimension as shown) between the top and bottom sheets 100, 200 connect at least portions of the top and bottom sheets 100, 200 to one another along respective seam lines 108a and 108b such that a plurality of smaller, open-ended chambers are formed in the interior of plenum chamber 302. The partition members 108 are laterally spaced a distance from perimeter sidewalls 107 and extend in a direction that is substantially parallel to the lateral edges 103, 202 of the top and bottom sheets 100, 200 (defining a lateral length dimension as shown). The height (e.g., aforementioned vertical extension) dimension of these laterally extending partition members 108 is preferably greater than the height of perimeter sidewalls 107.

As shown in FIG. 15, portions of the top and bottom sheets 100, 200 could also be connected to one another without providing a plurality of partition members and with or without providing the perimeter sidewalls 107. That is, in a structure including sidewalls 107, the top and bottom sheets 100, 200 could be joined by a single partition member 108, as shown in FIGS. 15a and 15b. In addition, in a structure that does not include perimeter sidewalls 107, that is, a structure wherein the upper and lower sheets are directly connected to one another along the respective longitudinal edges thereof, the top and bottom sheets 100, 200 could be joined by another junction 900 as shown in FIGS. 15c and 15d.

Figure 15A:
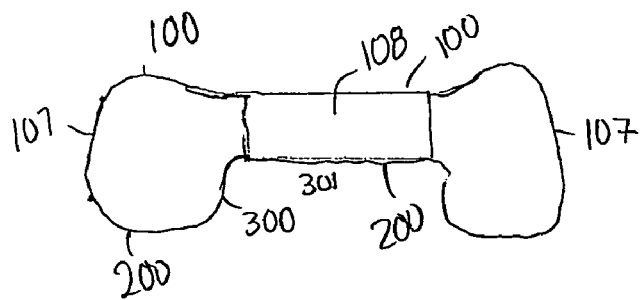
FIGS. 15a-15e are sectional end views of material movers having different means connecting the top and bottom sheets and having different weir locations according to various aspects of the present invention.
Figure 15B:
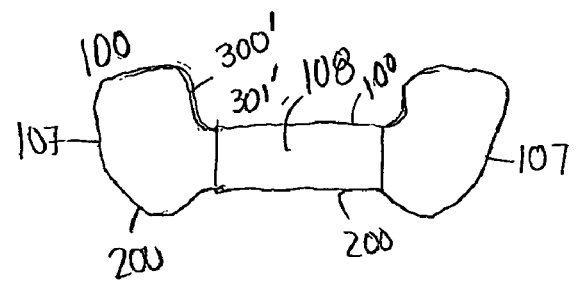
Figure 15C:
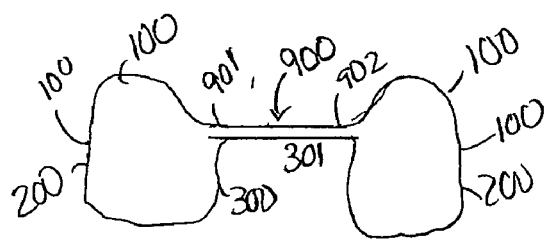
Figure 15D:
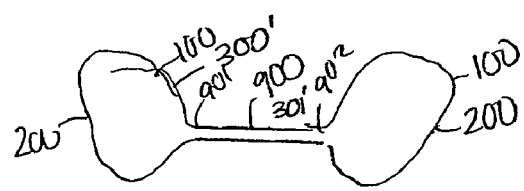

Examples of means comprising junction 900 for connecting the sheets shown in FIG. 15c and 15d that does not involve interposing another partition member, include, but are not limited to seam lines formed by heat sealing, sewing or otherwise adhering portions of the top and bottom sheets 100, 200 together across at least a portion of the lateral width dimensions thereof. The choice between using partition members 108 and junctions 900 can be made depending upon the application, so long as the top and bottom sheets are connected to one another in order to prevent unwanted ballooning or cradling effects and to control the definition of the fluid weir and the dissipation of the fluid film within the reservoir defined by the weir when fluid is introduced into the plenum chamber (e.g., when the plenum chamber is inflated). Further, the choice between using a single partition member having a vertical height dimension, or plurality of such partition members or directly connecting the top and bottom sheets can also be made based on the desired overall height or thickness dimensions of the pallet portion of the material mover, which may or may not also be application dependent. It should be understood, however, based on the above, that if a seam line or heat weld, for example, is used to provide the junction 900 in lieu of a partition member 108, the terminal ends of that junction 901, 902 should still be laterally spaced a distance form the longitudinal perimeter sidewalls 107.

Figure 15E:
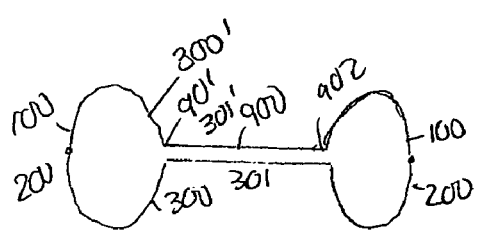

FIGS. 15a to 15d also show that these means for joining the top and bottom sheet 100, 200 can be employed in a variety of situations, such as: when the width of the bottom sheet is greater than that of the top sheet, defining a fluid weir 300 on the bottom sheet 200 surrounding a fluid film reservoir 301 as shown in FIGS. 15a and 15c; when the width of the top sheet is greater than that of the width of the bottom sheet, defining a fluid weir 300' on the top sheet 100 surrounding a fluid reservoir 301' as shown in FIGS. 15b and 15d; and when the top and bottom sheets each have substantially the same width but each also include a sufficient amount of extra material provided to define two weir structures including weir 300 (on the bottom sheet) and weir 300' (on the top sheet), as shown in FIG. 15e. It can be seen that the respective widths (or excess material laterally provided to) the top and bottom sheets 100, 200 determines whether the weir will be located on the lower surface, the upper surface, or both surfaces, whether or not perimeter sidewalls or partition walls are provided.

To substantially or inhibit and control the dissipation of fluid from the fluid film, a fluid weir 300 is provided about the outer periphery of bottom sheet 200 that substantially surrounds the central portion 206, and preferably all of the orifices 207, of the bottom sheet 200. The fluid reservoir 301 is essentially defined and bounded by the surrounding fluid weir 300. There should be no orifices in the portions of the bottom sheet 200 defining the fluid weir 300 through which fluid could escape from the plenum chamber to a place other than fluid reservoir 301. As shown, fluid weir 300 that regulates the dispersion of fluid from the fluid film reservoir 301 is essentially defined by the structure of top and bottom sheets in that the width of the bottom sheet 200 is greater than the width of top sheet 100, at least in the lower and middle regions 203 and 204. Fluid from the plenum chamber exits through the orifices 207 and is substantially contained by the barrier provided by fluid weir 300, such that the fluid film created is substantially maintained in the reservoir 301 at least under the central portion 206 of the bottom sheet 200. Thus, the physical structure of fluid weir 300 itself inhibits the dissipation of fluid from the fluid reservoir 301 in the central portion 206 of the bottom sheet defining the bottom portion of the material mover.

It should also be noted that, although it is not shown in detail, the top sheet 100 in FIGS. 15b, 15d and 15e could be provided with orifices, instead of the bottom sheet 200, to provide a fluid mattress having a fluid film in reservoir 301', that is, in a position where a patient or load is typically positioned. Additionally, the top sheet 100 shown in FIG. 15e could be provided with orifices in addition to the bottom sheet 200 such that the weir 300 and the weir 300' each serve to contain a fluid film within the respective reservoirs 301 and 301'.

It should be noted, however, that the fluid weir structure can be modified, for example, by increasing the lateral dimension (i.e., width) of the fluid weir by adding material to the respective lateral edges 103 and 202 of top and bottom sheets 100 and 200, respectively, while maintaining the other dimensional relationships between the top and bottom sheets, the perimeter sidewalls and the partition members. It should be apparent from the above discussion that the fluid weir structure according to the present invention can be accomplished through various configurations, so long as the dimensional relationships between the top and bottom sheet, partition members and perimeter sidewalls, are maintained. That is, the partition members, if provided, would need to have a greater height than the height of the perimeter sidewalls and the width of the bottom sheet would need to remain larger than the width of the top sheet.

The material mover of the present invention also includes means for securing a load on the top surface of top sheet 100. As shown in FIG. 4, for example, securing straps 109 are provided on an upper surface (e.g., the top sheet 100) of the material mover and extend laterally across the top sheet 100 in a direction that is substantially parallel to lateral edges 103 of the top sheet. As shown, one end of each securing strap 109 is attached at the seam line (e.g., seam line junction 400 shown in FIG. 6) between the top and bottom sheets, and a second, free end of each strap is dynamically provided to secure a load or patient positioned on the material mover in connection with at least a portion of a free end of another laterally opposed strap 109. In this regard, the free ends of the securing straps are preferably equipped with corresponding fastening means, such as bulking, adhesive, hook and loop or other mechanical fastening means, to facilitate a secure connection between the opposed straps.

FIG. 4 also shows gripping members, e.g., load pulling straps 110 and 111, provided along the longitudinal side portions of the material mover as means for translocating the material mover, and any load positioned thereon, over a transporting surface. Load pulling straps 110 are provided in middle region 105 of top sheet 100 and the two ends of its loop-type structure are attached at the seam line joining top sheet 100 and perimeter sidewall 107. Load pulling straps 111 are provided in the upper region 104 and lower region 106 of top sheet 100 and upper region 205 and lower region 203 of bottom sheet 200. One end of each lead pulling strap 11 is attached at the seam line joining top sheet 100 and perimeter sidewalls 107, and an opposed end of its loop-type structure is attached at the seam line joining perimeter sidewalls 107 and bottom sheet 200.

The particular structure of the load pulling straps 110, 111 is not, however, limited to the loop-type structure shown, or to any particular structure. For example, the load pulling straps can be any grippable shape, so long as they are adapted to be gripped and the load pulling function is maintained.

FIG. 6 is an exploded side view of a seam line junction 400 that is provided between the top sheet 100 and an upper end of the longitudinal perimeter sidewall 107 as shown in FIG. 2. As shown, part of an end portion 100a of the longitudinal side of top sheet 100 is folded over part of an upper end portion 701 of perimeter sidewall 107 (or, alternatively, as described below, end portion 200a of one of the lateral and longitudinal sides of bottom sheet 200), and is looped around the upper terminal end 702 of perimeter sidewall 107 (or, alternatively, as described below, the terminal end 200b of one of the lateral and longitudinal sides of bottom sheet 200). In this manner, portions of the upper end portion 701 of the perimeter sidewall 107 are sandwiched between folded over portions of end portion 100a of the top sheet 100, and the terminal end 100b of top sheet 100 is interposed between a portion of the upper end portion 701 and the upper terminal end 702 of the perimeter sidewall 107. It should be noted that a similar seam line junction 400 is also provided on the opposite lateral side of the material mover, as shown in FIG. 2, as well as between the opposed longitudinal edges of the bottom sheet 200 and lower ends of the longitudinal perimeter sidewalls 107 on either side of the material mover.

FIG. 6 is but one example of a seam line junction that can also be provided between portions of the longitudinal and/or the lateral edges of top and bottom sheets 100 and 200, respectively, either in lieu of, or in addition to providing perimeter sidewalls 107. That is, as shown in FIG. 2, a seam line junction 400 as described above is provided between each of the upper and lower sheets 100, 200 at each end 701 of the perimeter sidewalls 107, whereas only a single seam line junction is understood to be present along the joined lateral edges 103 and 202 of the top and bottom sheets 100, 200. In this case, part of the end portion 100a of the lateral edge 103 of top sheet 100 is folded over part of the end portion 200a of the lateral edge 202 of bottom sheet 200, and is looped around terminal end 200b of the lateral edge 202 of bottom sheet 200. In this manner, portions of end portion 200a of the lateral edge 202 of bottom sheet 200 are sandwiched between folded over portions of end portion 100a of the lateral edge 103 of top sheet 100. The terminal end 100b of the lateral edge 202 of top sheet 100 is interposed between a portion of end portion 200a and the terminal end 200b of the lateral edge 202 of bottom sheet 200.

Figure 7:
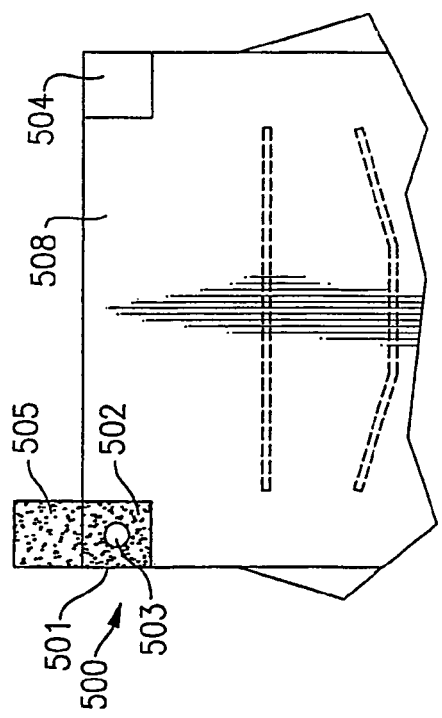
FIG. 7 is a top view of a fastener and fluid inlet arrangement according to one aspect of the present invention.

FIG. 7 shows a fastener 500, including at least one fastening means, such as a hook-and-loop fastener 501 (e.g., Velcro®) positioned on a portion of a top sheet 508. Fluid inlet orifice 503 is located on a portion of a first mating surface 502 that corresponds to a second mating surface 505 defining a flap 504 adapted to cover 502 such that flap covering 504 covers the first mating surface 502 and fluid inlet orifice 503. The first and second mating surfaces 502 and 505, respectively, can also include other fastener means or structures, such as, for example, a snap-button mating structure. Two fasteners 500 are shown positioned on the opposed upper lateral corners of the top sheet 100 in FIG. 4.

The structure of the first mating surface 502 proximate the fluid inlet 503 corresponds to a structure and hook-and-loop type fastener mating surface 506 of a fluid provider unit to provide easy coupling between fluid inlet orifice 503 and the opening of coupler 507, which extends from a portion of fluid provider hook-and-loop fastener mating surface 506. An example of such a quick coupling mechanism between fluid inlet arrangement 500 and the fluid provider system (not shown), is disclosed in copending U.S. patent application Ser. No. 10/534,599, entitled "FLUID PROVIDER ASSEMBLY AND PORTABLE FLUID PROVIDER SYSTEM INCLUDING SAME," filed on May 11, 2005, which corresponds to PCT Application No. PCT/US2003/036250, filed on Nov. 10, 2003, the entireties of which are incorporated herein by reference. This provides efficient and secure attaching and detaching of the fluid provider system from the fluid inlet arrangement of fastener 500. Similar to the arrangement first and second mating surfaces discussed above, the mating surface of the fluid provider unit can be a snap-button mating surface corresponding to the first mating surface of the fastening means on the material mover.

Figure 11:
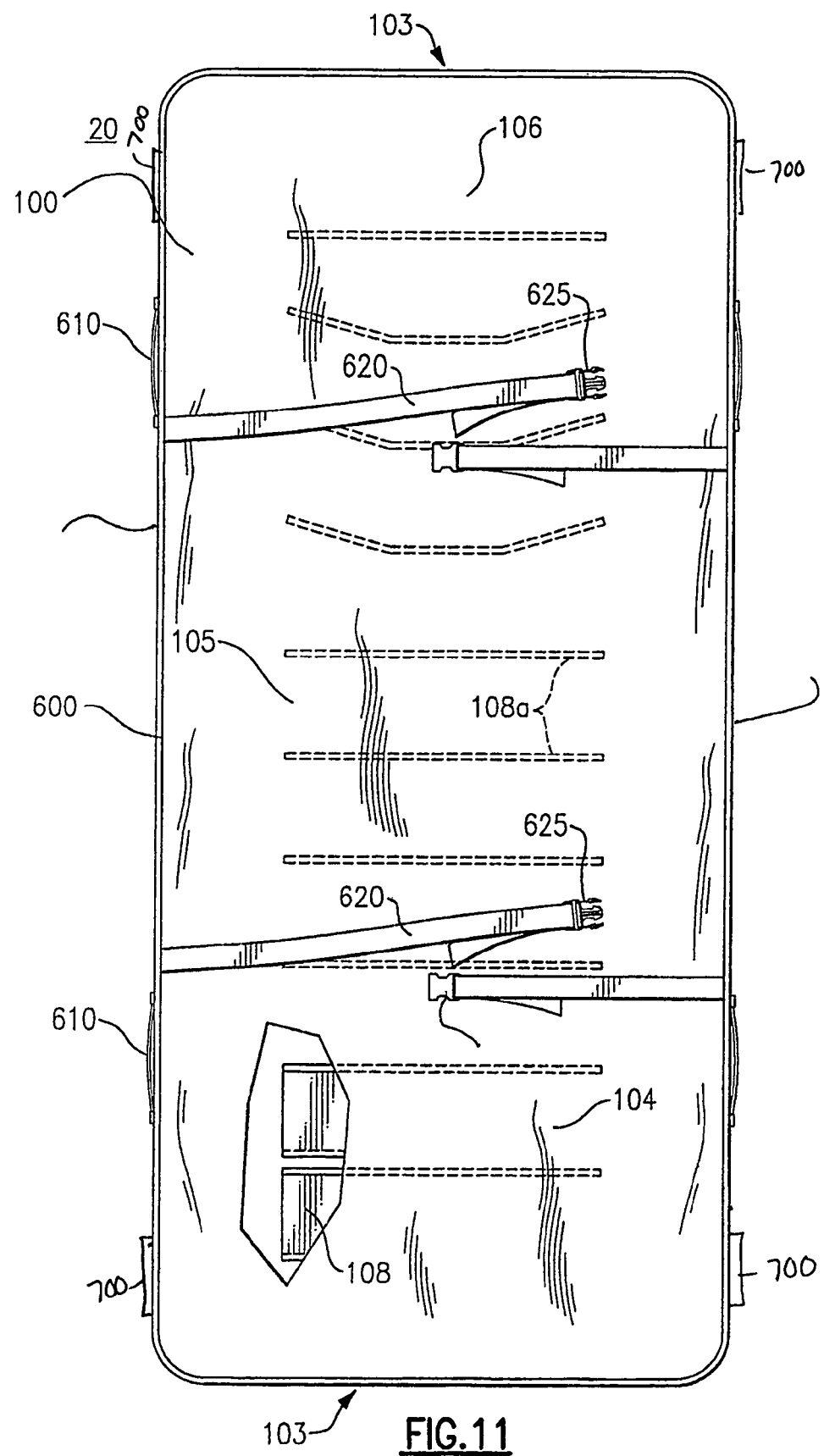
FIG. 11 is a top view of the material mover of FIG. 10.

FIG. 11 shows a material mover 20 including a substantially rectangular top sheet 100 having longitudinal edges 102, lateral edges 103, and upper, middle and lower regions 104-106, respectively. The top sheet and the lateral and longitudinal edges are connected to portions of a substantially rectangular bottom sheet (not shown) to define a chamber (e.g., a plenum) between the top and bottom sheets that is adapted to be filled with a fluid.

Figure 12:
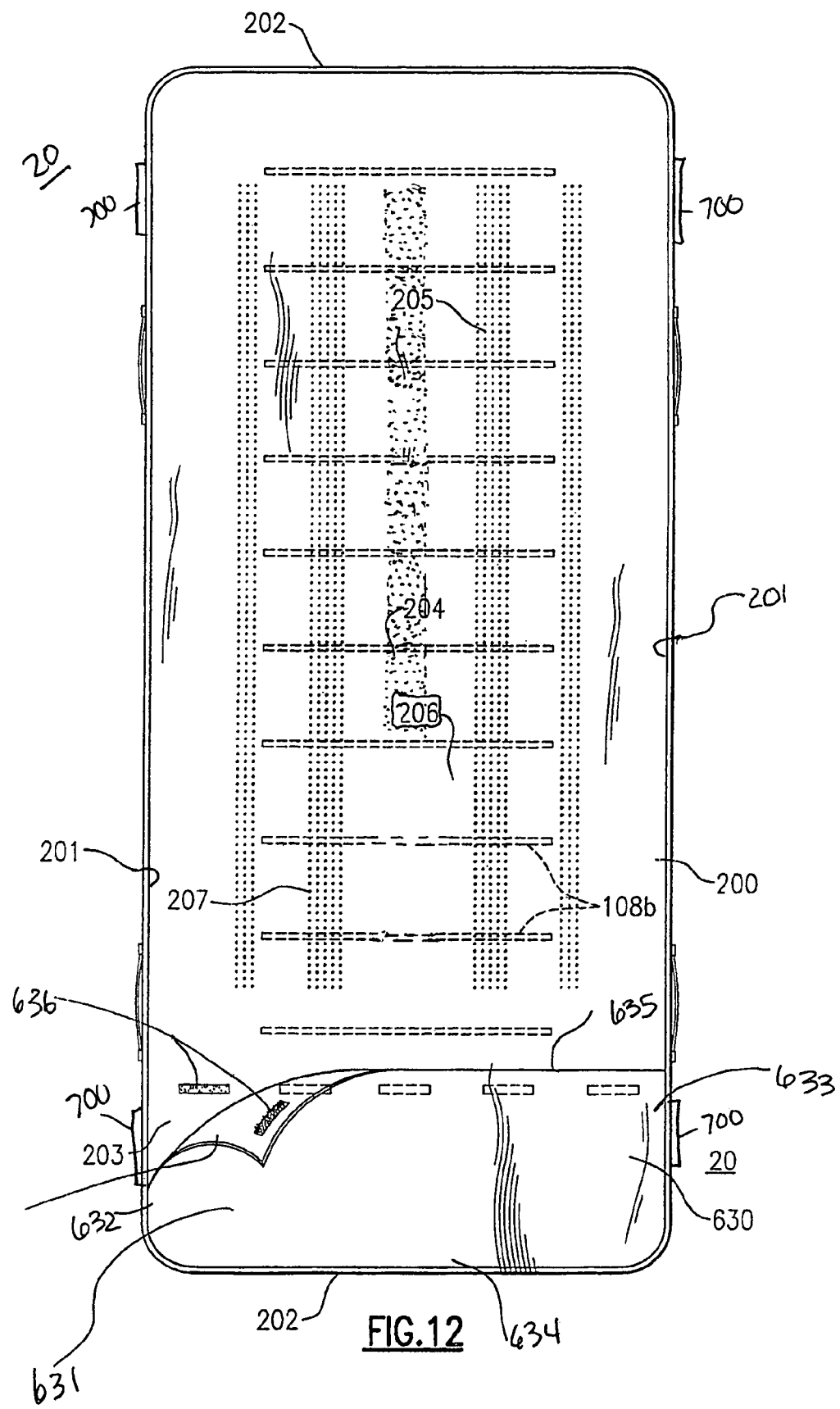
FIG. 12 is a bottom view of the material mover of FIG. 10.

The material mover 20 shown in FIG. 12 includes substantially rectangular bottom sheet 200 having longitudinal edges 201, lateral edges 202, and lower, middle and upper regions 203-205, respectively. The bottom sheet (not shown) preferably has a greater width than a width of the top sheet, at least in the middle and lower regions of the top and bottom sheets for the reasons described above.

The material mover 20 shown in FIG. 12 also includes a storage pouch 630 that is defined by an outer surface of the lower region 203 of bottom sheet 200 and a pouch sheet 631. The pouch sheet 631 has first and second lateral ends 634 and 635, respectively, and first and second longitudinal ends 632 and 633, respectively, contacting a portion of the outer surface of bottom sheet 200 in lower region 203.

As shown, the first lateral end 634 of pouch sheet 631 is connected to bottom sheet 200 at the connecting junction between the bottom sheet 200 and one of the lateral perimeter sidewalls 107 (shown in FIG. 10 and discussed below) that is connected to the lower region 203 of bottom sheet 200. The second lateral end 635 of pouch sheet 631 extends a distance toward the middle region 204 of the bottom sheet 200 and is releasably fastened to a portion of bottom sheet 200 via fastening means 636. Examples of suitable fastening means include, but are not limited to, a hook-and-loop type fastener and a snap-button fastener. At least portions of first and second longitudinal ends 632, 633, of pouch sheet 631 are each connected to bottom sheet 200 at the connecting junction between the bottom sheet 200 and a respective one of the longitudinal perimeter sidewalls 107 that are connected to the lower region 203 of bottom sheet 200.

Figure 10:
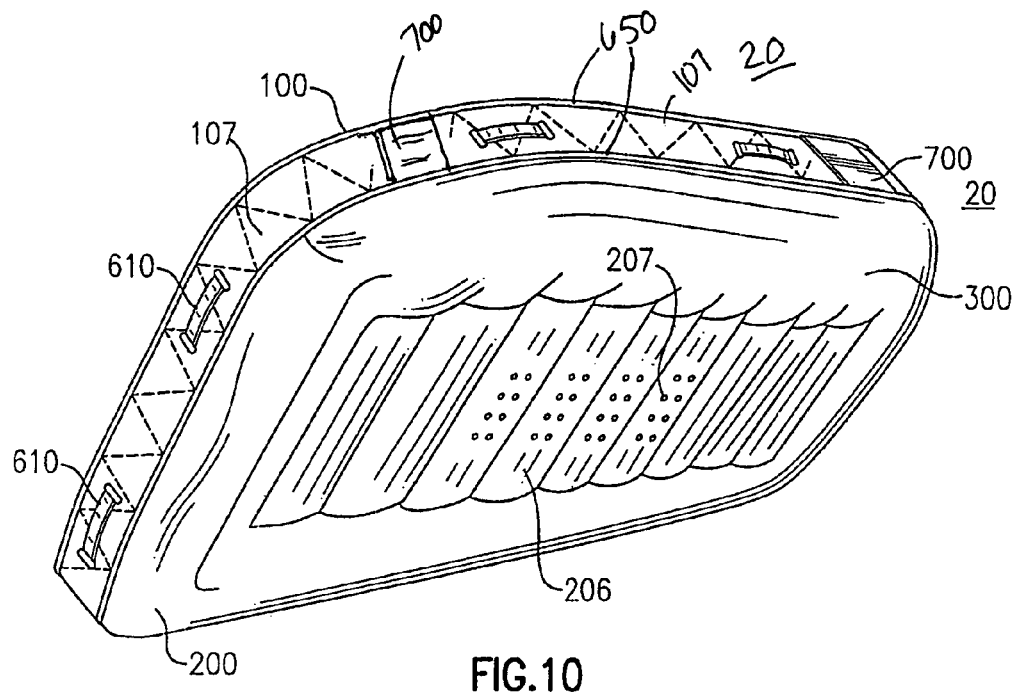
FIG. 10 is a perspective bottom view of an inflated material mover according to another aspect of the present invention.
Figure 13:
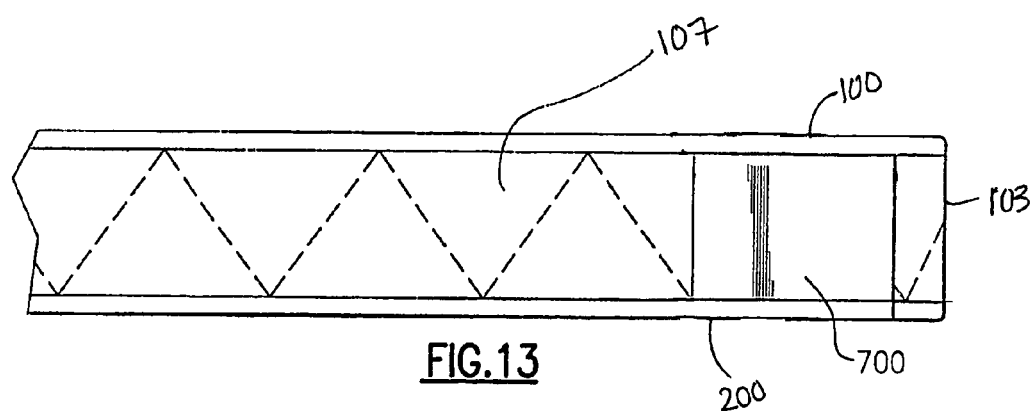
FIG. 13 is a partial side view of the material mover of FIG. 10.

As shown in FIGS. 10 and 13, the lateral and longitudinal perimeter sidewalls 107 are interposed between and connect at least portions of the lateral and longitudinal edges of the top and bottom sheets to one another. The height of the lateral and longitudinal perimeter sidewalls 107 connecting the top and bottom sheets to one another is preferably less than the height of partition members 108, along at least a portion of the respective lateral edges 103, 202, and the respective longitudinal edges 102, 201 of the top and bottom sheets 100, 200.

The lateral and longitudinal perimeter sidewalls 107 shown in FIG. 10 extend substantially around the entire periphery of the material mover, that is, along the entire lateral length and longitudinal length of each of the top and bottom sheets, and the height of the sidewalls 107 is less than the height of partition members 108 (not shown in FIG. 10). Connecting means 650 connects each of lateral and longitudinal perimeter sidewalls 107 to each of top sheet 100 and bottom sheet 200 along the entire lengths of the lateral and longitudinal edges of the top and bottom sheets.

The connecting means 650 can be any mechanical and/or chemical joining member or means capable of forming a sealed junction between the lateral and longitudinal perimeter sidewalls 107 and the top and bottom sheets 100 and 200. Suitable examples of such connecting means include, but are not limited to seam line junctions, heat seal junctions, magnetic strip junctions and mechanical junction forming means such as reinforced clamping members that hold together the respective sheet and/or sidewall edges. It should be noted, however, that any of the above connecting means are required to be sufficiently fluid-tight to prevent fluid from escaping the chamber at the respective junctions between the top and bottom sheets and/or the respective sidewalls.

Preventing fluid loss from the fluid-filled chamber between the junction where portions of the perimeter sidewalls are connected to portions of each of the top and bottom sheets (as shown in FIG. 10) is important because, as mentioned above, such fluid loss translates into an increased need for electric power to maintain the volume of fluid in the plenum chamber required to maintain sufficient inflation of the material mover and to provide a sufficient fluid film thereunder for translocation.

The material mover 20 shown in FIG. 10 also includes load pulling handles 610 each having first and second ends that are attached to the lateral and longitudinal perimeter sidewalls 107. As shown in FIG. 11, the material mover 20 also includes a plurality of patient restraint straps 620 provided in portions of the middle region 105 of top sheet 100 near the upper and lower regions thereof. Each patient restraint strap 620 has one end that is fixedly attached at the connecting junction provided by connecting means 650 (shown in FIG. 10) between top sheet 100 and a respective one of the longitudinal perimeter sidewalls 107. The opposing end of each patient restraint strap is freely translocatable and includes one of fastener means 625 and corresponding fastener means 626 on an end portion thereof. For example, the free end of the strap 620 located on the left hand side includes fastener means 625, which is shown as a male clip portion, and the end of a laterally opposing strap 620 (that is fixed from a position on the right hand side that laterally opposes the left-hand strap 620) includes fastener means 626. As shown, fastener means 626 is a female receiving portion adapted to provide a mating connection with the male clip portion of fastening means 625. In that manner, a patient can be secured on the top sheet of the material mover when the opposing patient restraint straps are fastened together with the respective fastening means 625, 626.

As shown in FIG. 3, plenum chamber 302 is divided into a plurality of open-ended chambers via a plurality of partition members 108. The partition members 108 are disposed within the plenum chamber 302 and are attached to portions of the top and bottom sheets such that the partition members 108 effectively connect (vertically, as shown) at least portions of top and bottom sheets 100, 200 to one another. The partition members extend in a direction that is generally parallel to the respective lateral edges 103, 202 of the top and bottom sheets 100, 200, and the outer edge portions of the partition members are laterally spaced a distance from each of the lateral and longitudinal perimeter sidewalls 107.

The arrangement of partition members 108 allows fluid that is present in the plenum chamber 302 to circulate through the smaller, open-ended chambers defined between the partition members and be evenly distributed within the chamber 302 before leaving via the orifices 307 to provide fluid to the fluid reservoir 301. In addition to this air distribution function, partition members 108 help to prevent over-inflation of the plenum chamber, also known as ballooning, by providing a physical means for restricting the outward (e.g., vertical) expansion of the top and bottom sheets.

Fluid weir 300 shown in FIG. 10 is defined along the outer periphery of bottom sheet 200 and effectively serves a fluid damming function. The fluid weir also defines the outer periphery of fluid reservoir 301, which is substantially surrounded by the weir structure. In addition, the fluid weir 300 is positioned to substantially surround all of the orifices 207 in communication with chamber 302 and the fluid reservoir 301. As fluid exits from the plenum chamber 302 through the orifices 207, the fluid accumulates in the fluid film reservoir 301, which thus provides a fluid film beneath the bottom sheet of the material mover. The fluid film is substantially contained within the boundaries of the fluid reservoir 301 defined by fluid weir 300 between the bottom sheet and the transporting surface.

The fluid weir can have any structure that effectively defines the boundaries of the fluid reservoir 301 under the material mover, so long as the fluid flow outward from beneath the material mover is sufficiently reduced and/or controlled. Providing a physical structure, such as fluid weir 300, to contain and maintain a sufficient fluid film beneath a portion of the material mover makes it possible to obtain and maintain a better quality fluid film between the material mover and the transporting surface with less electric power required. Accordingly, the desired volume and position of the fluid film created beneath the material mover, relative to the load placed on the material mover and the transporting surface, can be effectively maintained by preventing the escape of fluid from fluid reservoir 301 with the weir structure, and without the need for a high powered fluid provider unit, thereby decreasing the operating costs associated with the material mover.

Another substantial advantage of providing by a high quality fluid film between the bottom sheet of the material mover and the transporting surface according to the present invention is that substantially less manual effort is required to safely move objects across transporting surfaces. This not only prevents injury to the load or patient positioned on top of the material mover, but also protects against straining injuries typically observed in people who are required to continuously lift or pull heavy loads. Moreover, a high quality fluid film protects the bottom sheet of the material mover from undesirable wear damage by reducing the frictional forces acting between the bottom sheet and the transporting surface, and thus reducing the physical damage to the bottom portions of the material mover. Accordingly, the useful life of the material mover according to the present invention can effectively be increased.

Another means for increasing the efficiency of the material mover according to the present invention is by providing one or more, and preferably a plurality of fasteners such as fastener 700 shown in FIGS. 10 to 14, each of which include a first mating surface 701 including a fluid inlet orifice 703 located in a portion thereof and which is in fluid communication with the plenum chamber of the material mover. The fastener 700 also includes a second mating surface 705 corresponding to the first mating surface and adapted to provide a flap to cover the first mating surface 701. A fluid provider unit is connected to fluid inlet orifice 703 and supplies fluid into such as plenum chamber 302 shown in FIG. 3, for example. The type of fastening means comprising the fastener 700 is not particular limited and can be, for example, a hook-and-loop fastener, a snap-button fastener, a magnetic thread fastener or a magnetic tape fastener.

One or more fasteners 700 can be provided in multiple locations on any one of the top sheet 100, the bottom sheet 200, and the lateral and longitudinal perimeter sidewalls 107. Preferably, at least one pair of two fasteners 700 are provided in corresponding positions on opposed surface portions of longitudinal perimeter sidewalls 107. For example, as shown in FIGS. 1 to 12, one fastener 700 is provided on a portion of one longitudinal sidewall 107 proximate one lateral side 103 of the material mover 20, and another fastener 700 is provided in a corresponding position on the opposed longitudinal sidewall 107. In addition to this first pair of fasteners 700, a second pair of fasteners 700 is also provided on opposed longitudinal sidewalls 107 proximate the other lateral edge 103 of the material mover 20. By providing a plurality of such fasteners, and preferably, a plurality of such fasteners arranged in opposingly positioned pairs on the sidewalls 107, the number of potential fluid inlets that could be used to provide fluid to the material mover is increases, which not only increases positional flexibility with respect to the location of the material mover within an enclosed or otherwise limited space, but also allows for the provision of multiple fluid provider if s the size and/or weight of the load should require it.

Figure 14:
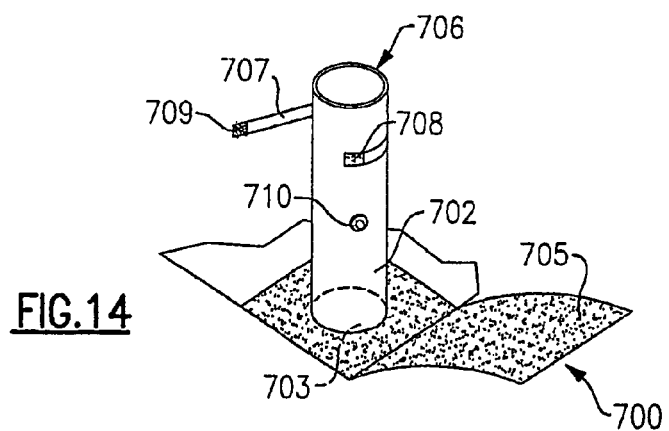
FIG. 14 is a perspective view illustrating a fastener and fluid inlet arrangement according to one aspect of the present invention.

As shown in FIG. 14, fastener 700 also includes a retractable conduit 702 having one end that passes through the fluid inlet orifice and is attached to an inner surface of the lateral perimeter sidewall 107 proximate the fluid inlet orifice 703. Conduit 702 also includes an opposed second end 706 capable of passing through the fluid inlet orifice 703 such that the second end 706 of the conduit 702 extends outwardly away from fastener 700 and is located in an exterior position on the material mover. The retractable conduit 702 includes additional fastening means for securing a portion of a fluid provider unit thereto. For example, the conduit 702 can include a snap-button fastener 710 on an inner circumferential surface thereof that is adapted to mate with a corresponding fastener provided on an outer surface of a portion of a fluid provider unit that is positioned therein, and/or an adjustable tightening strap 707 with a hook-and-loop fastening means 708,709 positioned around the outer circumferential surface of the second end 706 of the conduit 702.

The retractable conduit 702 provides a retention mechanism for the fluid provider unit to prevent the fluid provider unit from unexpectedly detaching from the fluid inlet of the material mover. This improved attachment reduces the risk of a blower hose coming loose and flailing about, for example, which could cause a significant threat of injury or damage to a patient or a load, or the personnel operating the material mover. The retention mechanism also reduces the risk of the plenum chamber suddenly degassing because the fluid provider unit becomes detached.

The individual components of the present invention as described above may be formed from a variety of known materials. For example, top and bottom sheets 100, 200, pouch sheet 631, and perimeter sidewalls 107 can each be formed from any flexible, non-fluid-permeable material, suitable examples of which include, but are not limited to, plastic (e.g., polyethylene), tyvek and coated nylon. It is also preferred that the material be recyclable (such as washable, for example), but more preferably, disposable (such as burnable without causing the release of toxic substances therefrom). The material of these members can have a thickness in a range of 2-3 mm, for example. While partition members 108 can be formed from the same materials as the top and bottom sheets and the perimeter sidewalls, the partition members 108 are not required to be fluid-impermeable. Load securing and load pulling straps 109, 110 load pulling handles 610, and patient restraint straps 620 can be formed from any known material that performs without degradation under the application of concentrated force.

While the present invention has been particularly shown and described with reference to the drawings, it will be understood by one skilled in the art that various changes in detail may be effected therein without departing from the spirit and scope of the invention as defined by the claims.

I claim:

1. A material mover for transferring a load, comprising:
   a substantially rectangular top sheet defining an uppermost support surface of said material mover and having longitudinal edges extending in a length direction of said material mover and defining a length dimension, lateral edges extending in a width direction of said material mover and defining a width dimension that is less than said length dimension, an upper region, a middle region and a lower region;
   a substantially rectangular bottom sheet having longitudinal edges extending in a length direction of said material mover and defining a length dimension, lateral edges extending in a width direction of said material mover and defining a width dimension that is less than said length dimension, an upper region, a middle region, a lower region, said width dimension of said bottom sheet being greater than said width dimension of said top sheet in said upper, middle and lower regions of said top and bottom sheets, and a plurality of orifices perforating at least a central portion of said bottom sheet;

lateral and longitudinal perimeter sidewalls respectively connecting at least portions of said lateral and longitudinal edges of said top sheet and said bottom sheet to one another and defining a plenum chamber between said perimeter sidewalls and said top and bottom sheets;

a plurality of partition members disposed within said plenum chamber and directly connecting at least central portions of said top sheet and said bottom sheet to one another, said partition members extending in a generally parallel direction with respect to said lateral edges of said top sheet and said bottom sheet and being spaced a distance from said lateral and said longitudinal perimeter sidewalls, wherein a height of each said lateral and longitudinal perimeter sidewalls is less than a height of said partition members along at least a portion of respective ones of said lateral and longitudinal edges of said top sheet and said bottom sheet; and a fluid weir defined at least along an outer peripheral portion of said bottom sheet and substantially surrounding said plurality of orifices in said bottom sheet, said fluid weir defining a fluid reservoir at least at said central portion of said bottom sheet;

wherein a fluid is supplied to said fluid reservoir from said plenum chamber via said orifices, a fluid film is formed at least between said central portion of said bottom sheet and a surface in contact with said bottom sheet, and wherein the fluid in said fluid film is substantially inhibited from dissipating from said fluid reservoir and is substantially contained in said fluid reservoir by said fluid weir.

2. The material mover of claim 1, further comprising at least one handle attached to a portion of said material mover.

3. The material mover of claim 2, wherein said at least one handle includes first and second ends, each said first and second ends being attached to one of said lateral and longitudinal perimeter sidewalls.

4. The material mover of claim 2, wherein said at least one handle comprises a plurality of said handles, and wherein said first and second ends of said plurality of handles are each attached to a respective one of each said lateral and longitudinal perimeter sidewalls.

5. The material mover of claim 1, wherein said lateral and longitudinal perimeter sidewalls respectively extend substantially the entire length of each said lateral and longitudinal edges of said top sheet and said bottom sheet.

6. The material mover of claim 5, further comprising a joining portion defined between said top sheet and each said lateral and longitudinal perimeter sidewalls, and a connecting junction defined between said bottom sheet and each said lateral and longitudinal perimeter sidewalls.

7. The material mover of claim 6, wherein end portions of any one of said top and bottom sheets are folded over end portions of said perimeter side walls and looped around terminal ends of said perimeter side walls such that terminal ends of said top and bottom sheets are interposed between portions of said end portions of said perimeter side walls and said terminal ends of said perimeter side walls.

8. The material mover of claim 6, further comprising a storage pouch defined between a portion of an outer surface of said lower region of said bottom sheet and another sheet disposed on said portion of said bottom sheet.

9. The material mover of claim 8, wherein a first lateral end of said another sheet is connected to said bottom sheet at said joining portion between said bottom sheet and one of said lateral perimeter sidewalls in said lower region of said bottom sheet, wherein a second lateral end of said another sheet is spaced a distance from said first lateral end in a longitudinal direction of said bottom sheet such that opposed first and second longitudinal edges of said another sheet extend toward said middle region of said bottom sheet, wherein said second lateral end of said another sheet is releasably fastened to a portion of said bottom sheet via fastening means.

10. The material mover of claim 9, wherein at least a portion of said first and said second longitudinal ends of said another sheet are connected to said bottom sheet at said joining portion between said bottom sheet and each said longitudinal perimeter sidewall in said lower region of said bottom sheet.

11. The material mover of claim 6, further comprising a plurality of straps at least in said middle region of said top sheet, each said strap having a first end that is fixed at said joining portion between said top sheet and one of said longitudinal perimeter sidewalls, and an opposed second end, said second end of each said strap including fastening means.

12. The material mover of claim 11, wherein said fastening means comprises one of a pair of mating fasteners, and wherein laterally opposed ones of said straps have corresponding ones of said mating fasteners.

13. The material mover of claim 6, wherein a portion of said top sheet proximate an end thereof is folded over a portion of said bottom sheet proximate an end thereof and looped around a terminal end of said bottom sheet such that a terminal end of said top sheet is interposed in a region between said end portion of said bottom sheet and said terminal end of said bottom sheet.

14. The material mover of claim 1, further comprising at least one fastener having a first mating surface comprising a fluid inlet orifice in communication with said chamber and adapted to be connected to a fluid provider unit such that fluid is supplied to said chamber, and a second mating surface corresponding to said first mating surface and adapted to provide a flap to cover said first mating surface.

15. The material mover of claim 14, wherein said at least one fastener is positioned in at least one location on at least one of said top sheet, said bottom sheet, and said lateral perimeter sidewalls and said longitudinal perimeter sidewalls.

16. The material mover of claim 14, wherein only two said fasteners are provided, each said fastener being positioned on an opposing portion of a respective one of said longitudinal perimeter sidewalls.

17. The material mover of claim 14, further comprising an internal conduit in fluid communication with said fluid inlet orifice and extending a distance therefrom toward a central portion of said plenum chamber such that said internal conduit is in fluid communication with said plenum chamber.

18. The material mover of claim 14, wherein said at least one fastener comprises any one of a fastener selected from the group consisting of a hook-and-loop fastener, a snap-button fastener, a magnetic thread fastener, a magnetic tape fastener and an adhesive fastener.

19. A material mover for transferring a load positioned thereon, said material mover comprising:

a substantially rectangular top sheet defining an uppermost support surface of said material mover and having longitudinal edges extending in a length direction of said material mover and defining a length dimension, lateral edges extending in a width direction of said material mover and defining a width dimension that is less than said length dimension, and upper, middle and lower regions;

a substantially rectangular bottom sheet having longitudinal edges extending in a length direction of said material mover and defining a length dimension, lateral edges extending in a width direction of said material mover and defining a width dimension that is less than said length dimension, and upper, middle and lower regions, said width dimension of said bottom sheet being greater width than said width dimension of said top sheet at least in said middle and lower regions of said top and bottom sheets, and a plurality of orifices provided on a portion of said bottom sheet at least in a location corresponding to a footprint of the load positioned on said top sheet;

perimeter sidewalls connecting at least portions of said longitudinal edges of said top and bottom sheets to one another and having a perimeter sidewall height;

a plurality of partition members directly connecting at least central portions of said top and bottom sheets to one another, said partition members extending generally parallel to said lateral edges of said top and bottom sheets and being spaced from said perimeter sidewalls, said partition members having a height that is greater than said perimeter sidewall height at least along a portion of respective ones of said lateral and longitudinal edges of said top sheet and said bottom sheet;

a fluid weir defined along an outer periphery of said bottom sheet to provide a fluid film reservoir at least under said central portion of said bottom sheet, wherein said fluid film underneath said central portion of said bottom sheet is substantially contained by said fluid weir; and at least one fastener positioned on at least one peripheral side surface of said material mover and having a first mating surface including a fluid inlet orifice and corresponding to a fastener mating surface of a coupler from a fluid provider system to matably connect said fluid inlet orifice of said first mating surface and the coupler of the fluid provider system, and a second mating surface corresponding to said first mating surface and adapted to provide a flap to cover said first mating surface.

20. A material mover, comprising:

a substantially rectangular top sheet defining an uppermost support surface of said material mover, a substantially rectangular bottom sheet, each said top and bottom sheets having lateral edges extending in a width direction of said material mover and defining a width dimension and longitudinal edges extending in a length direction of said material mover and defining a length dimension that is greater than said width dimension, wherein said width dimension of said bottom sheet is greater than said width dimension of said top sheet at least in middle and lower regions of said top and bottom sheets, a plurality of orifices provided on a portion of said bottom sheet at least in a location corresponding to a footprint of a load positioned on said top sheet, and lateral and longitudinal perimeter sidewalls respectively connecting at least a portion of said lateral and longitudinal edges of each said top sheet and said bottom sheet to one another;

at least one inflatable chamber defined between said top and bottom sheets and said lateral and longitudinal sidewalls, said inflatable chamber having a plurality of partition members directly connecting at least a central portion of said top sheet and said bottom sheet to one another positioned therewithin, said partition members extending parallel to said lateral edges of said top sheet and bottom sheet and being spaced a distance from said lateral and longitudinal sidewalls, wherein a height of each said lateral and longitudinal sidewalls is less than a height of said partition members along at least a portion of respective ones of said lateral and longitudinal edges of said top sheet and said bottom sheet;

at least one fastener having a first mating surface comprising a fluid inlet orifice in communication with said inflatable chamber and adapted to be connected to a fluid provider unit to enable fluid supply to said inflatable chamber, and a second mating surface corresponding to said first mating surface and adapted to provide a flap to cover said first mating surface; and means defining a fluid reservoir at least under a central portion of said bottom sheet and substantially containing a fluid film present in said fluid reservoir.

21. An inflatable support device, comprising:

a substantially rectangular top sheet defining an uppermost support surface of said inflatable support device and having opposed longitudinal edges defining a length dimension, opposed lateral edges defining a width dimension that is less than said length dimension, an upper region, a middle region and a lower region;

a substantially rectangular bottom sheet having opposed longitudinal edges defining a length dimension substantially corresponding to said length dimension of said top sheet, opposed lateral edges defining a width dimension that is less than said length dimension of said bottom sheet, an upper region, a middle region, a lower region, wherein said width dimension of said bottom sheet is greater than that of said top sheet, said bottom sheet being connected to said top sheet about the outer periphery thereof to define opposed longitudinal and opposed lateral sides of said material mover and to define a plenum chamber between said top and said bottom sheets;

one or more peripheral sidewalls disposed between and connecting at least a part of at least one of (1) said lateral edges of said top sheet and said lateral edges of said bottom sheet to define said lateral sides of said material mover and (2) said longitudinal edges of said top sheet and said longitudinal edges of said bottom sheet to define said longitudinal sides of said material mover;

a plurality of orifices perforating at least a central portion of said bottom sheet, said orifices being in fluid communication with said plenum chamber and with the atmosphere on said at least one of said top and aid bottom sheets;

means for directly connecting said top and said bottom sheets to one another in a height direction of said material mover within at least a central portion of said plenum chamber comprising at least one partition member extending in a generally parallel direction with respect to said lateral sides of said top and said bottom sheets and being laterally spaced a distance from said longitudinal and said lateral sides of said material mover, wherein a height dimension of said at least one partition member is greater than a height dimension of said one or more peripheral sidewalls; and at least one fluid weir defined at least along an outer peripheral portion of said bottom sheet and surrounding a fluid reservoir including said orifices on said bottom sheet;

wherein a fluid supplied to said plenum chamber is provided to said fluid reservoir from said plenum chamber via said orifices and a fluid film is formed in said reservoir at least in said central portion of said bottom sheet; and wherein the fluid in said fluid film is (1) substantially contained in said fluid reservoir by said fluid weir and (2) substantially inhibited from dissipating from said fluid reservoir by said fluid weir.

22. The inflatable support device of claim 21, further comprising one or more fluid inlets in fluid communication with said plenum chamber positioned on at least one of said opposed longitudinal and opposed lateral sides of said material mover.

* * * * *